Dec. 8, 1970 B. HAMEL 3,546,605

SEMI-LINEAR CORRECTOR NETWORK

Filed March 1, 1968

Inventor:
Bernard Hamel
By
Karl W. Flocks
Attorney

United States Patent Office 3,546,605
Patented Dec. 8, 1970

3,546,605
SEMI-LINEAR CORRECTOR NETWORK
Bernard Hamel, Paris, France, assignor to Societe Francaise d'Equipements pour la Navigation Aerienne, Neuilly-sur-Seine, Hauts-de-Seine, France, a joint-stock company of France
Filed Mar. 1, 1968, Ser. No. 709,731
Claims priority, application France, Mar. 31, 1967, 101,120
Int. Cl. H03b *1/04*
U.S. Cl. 328—167 8 Claims

ABSTRACT OF THE DISCLOSURE

A corrector network filter comprising a semi-linear cell, in which a linear filter is placed between an operator which raises the input signal to a certain power and another operator which raises the output signal of said filter to the inverse power, in which the phase-shift is that of the filter, the gain effect obtained by the cell being a function of the frequency of the signal different from that introduced by the filter.

The present invention relates to a semi-linear corrector network and more precisely to a cell in which a linear filter is mounted between two operators of inverse power.

It is known that linear corrector networks have up to the present time been subject to certain limitations due to the phase-gain relations of Bode's law; in particular, the gain cannot vary as a function of the frequency without variation of the phase.

The invention provides a cell, by means of which it has now become possible to vary the gain of a signal as a function of its frequency without affecting the phase.

According to the invention in fact, this cell comprises an operator P which increases the input signal to a certain power, a leading or delaying linear filter F, and an operator Q which raises to the power inverse of that obtained in the operator P, the gain effect carried out by the cell being a function of the frequency of the signal different from that effected by the filter F.

The invention has also for its object:

A cell comprising an operator P, a linear lead or delay filter F and an inverse operator Q, the said cell being followed by a linear delay or lead filter F′, so that the output signal of the corrector network thus defined is in phase with the input signal, while its amplitude is a function of the frequency of the signal;

A corrector network comprising a linear filter F′, a cell comprising an operator P, a linear filter F which re-establishes the signal in phase with the input signal in the network, an operator Q, the output signal being in phase with the input signal and its amplitude being a function of the frequency of the signal.

Other characteristic features and advantages of the invention will be brought out in the description which follows below with reference to the accompanying drawings, and giving purely by way of indication and not in any limitative sense, one form of embodiment of the invention.

Figure 1:
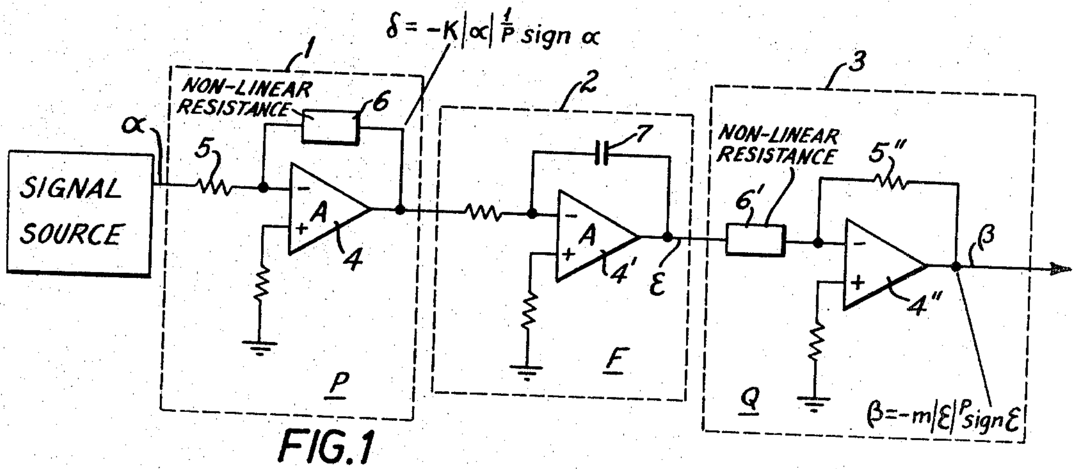
FIG. 1 is a circuit diagram of a cell in accordance with the invention.

In FIG. 1, there is seen a cell according to the invention, comprising an operator 1 which extracts the cube root of the signal "$\alpha$," an integrating delay filter 2, an operator 3 which raises to the power of 3 the output signal of the filter and supplies a transformed signal "$\beta$."

The operators comprise, in a manner known per se, amplifiers 4 and 4″, fixed resistances 5 and 5″, non-linear resistances 6 and 6′. The filter 2 comprises in known manner a condenser 7 in parallel with the amplifier 4′.

Assume that the input signal $\alpha=+e \sin \omega t$. If the system is limited to the first harmonic, the operator 1 converts this signal to a signal in which the phase is not changed (but in which the sign is reversed as a result of the electronic connection of the amplifier).

$$-\lambda\sqrt[3]{e}\sin \omega t$$

The integrating filter 2 receives this signal and delivers to the input of the operator 3 a signal:

$$\epsilon=-\frac{\lambda\sqrt[3]{e}}{\omega}\cos \omega t$$

which is lagging by $\pi/2$ with respect to the signal $\alpha$.

The operator 3 raises this signal to its cube and then delivers an output signal of which the first harmonic is:

$$\beta=+\frac{\mu e}{\omega^3}\cos \omega t$$

It can be seen that the cell of FIG. 1 according to the invention provides a signal, the phase shift of which is that of the filter F, and the amplitude of which is practically linear (that is to say of degree 1 in "$e$," and this kind of cell is in case known as semi-linear) and the gain effect of which is a function of the frequency "$\omega$" different from that introduced by the filter F.

In the example selected and shown, the frequency function introduced into the gain by the integrator 2 is $1/\omega$ and the frequency function of the cell is $1/\omega^3$.

Figure 2:
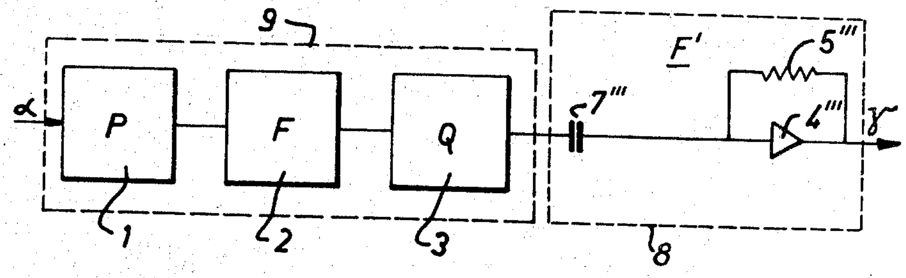
FIG. 2 is a diagram of the cell of FIG. 1 associated with a filter.

In consequence, if, after the cell of FIG. 1 there is connected a branch filter $F^1$ designated 8, with condenser 7‴, amplifier 4‴, and resistance 5‴ connected as shown in FIG. 2, the signal derived from $\beta$ becomes $$\gamma=+\frac{\mu e}{\omega^2}\sin \omega t$$

There is obtained a signal in place with the input signal, a linear function of the amplitude "$e$," but an inverse function of the power 2 of the frequency "$\omega$."

If, therefore, in a given automatic regulation device, the actual period of the signal transmitted by the loop tends to increase, the gain diminishes according to the invention in the proportion of the second power of this frequency variation of the signal.

By such an automatic regulation device is meant, for instance, a circuit loop for controlling the commands, for example, of an aircraft, in which the present invention would allow the obtaining of a gain effect where the action on rudders is independent of the amplitude of the signal input, which represents the accidental movement of the aircraft.

If instead of the power 3 there had been chosen operators 1 and 3 based on the power "$p$," the factor of the gain as a function of the frequency would be, in the case of FIG. 2, $1/\omega p—1$.

Figure 3:
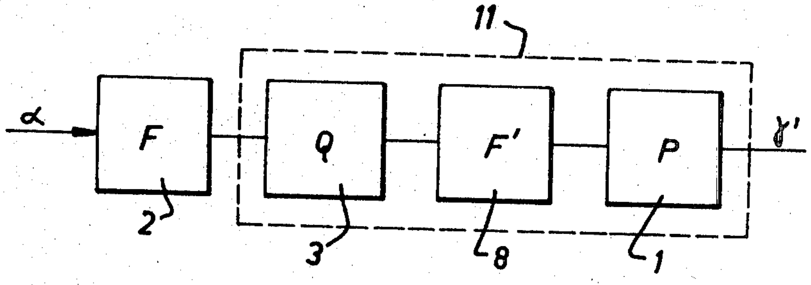
FIG. 3 is a diagram of an alternative form of the invention.

FIG. 3 provides an alternative form of the invention, according to which the cell 9 of FIG. 2 is replaced by the cell 11. and in which the block diagrams represent operators or filters similar to those of FIGS. 1 and 2. The treatment of the signal $\alpha = e \sin \omega t$ is then as follows:

Integration in F:

$$+\frac{e}{\omega} \cos \omega t$$

Raising to its cube in Q:

$$\frac{\mu e^3}{\omega^3} \cos \omega t$$

Differentiation in F1:

$$-\frac{\mu e^3}{\omega^2} \sin \omega t$$

Extraction of root in P:

$$+\frac{\lambda e}{\omega^{2/3}} \sin \omega t$$

It can be seen that the signal $\gamma'$ obtained is a semi-linear function of "$e$" and that the gain varies as $1/\omega^{2/3}$.

The cells can be grouped together in series or in parallel in order to obtain particular results.

If the power "$p$" has any value, the functions P and Q will be such that there is formed with P in the diagram of FIG. 1 for example:

$$\delta = -\sqrt[p]{|\alpha|} \text{ sign } \alpha$$

and similarly $\beta = |\epsilon|^p$ sign $\epsilon$ sign.

It will of course be understood that in the present text, when there is indicated an operator which raises to any power "$p$," it is meant that this operator carries out, between its input E and its output S, the operation defined as follows:

$$S = |E|^p \text{ sign } E \text{ sign } E$$

These functions will be obtained in practice by means of appropriate electronic devices, for example by operational amplifiers utilizing, in their input or feed-back circuit, a non-linear resistance of the desired characteristic. It is of course possible, by no longer respecting the semi-linearity, to form a diagram in which P and Q correspond to operations $$\sqrt[p]{\phantom{x}}$$

and raising to the power $n (n \neq p)$ by respecting the questions of sign referred to above.

In this way, it will of course be possible to utilize according to the invention the particular case which has proved advantageous in practice, in which $p=2$ and $n=2$.

It will be understood that the present invention has been described above purely by way of indication and not in any limitative sense, and that any modifications of detail may be made thereto, in conformity with its spirit, without thereby departing from its scope.

I claim:

1. A corrector network filter comprising
at least one cell including
a linear filter,
an operating means to raise a signal input to it to a certain power, connected to said linear filter,
another operating means to raise a signal input to it to the inverse of a power, connected to said linear filter.
said linear filter connected between said operating means and said another operating means with the phase shift being that of said linear filter and the gain effect of said cell being a function of the frequency of the signal different from that introduced by the filter.

2. The corrector filter network of claim 1, further characterized by
said another operating means, said linear filter, and said operating means connected in series, said another operating means supplying a signal of which the absolute value is the square root of the absolute value of the input signal, and the sign is that of the input signal,
said linear filter being an integrating filter,
said operating means supplying a signal, the absolute value of which is the square of the absolute value of the output signal of said linear filter, and the sign of which is the sign of said output signal,
and a differential filter connected to the output of said operating means
whereby the output signal of the network is in phase with the input signal and, if the input signal is of the form $\alpha = e \sin \omega t$, the output signal is of the form $$\gamma = \frac{\mu e}{\omega} \sin \omega t$$

3. The corrector filter network of claim 2, further characterized by
said operating means, said linear filter, and said another operating means connected in series and integrating filter connected to the input of said operating means,
said operating means raising to the power 3 the output signal of said integrating filter,
said linear filter being a lead filter,
said another operating means taking the cube root of the output signal of said lead filter
whereby the output signal of said network is in phase with the input signal and, if the input signal is in the form $\alpha = e \sin \omega t$, the output signal is of the form $$\gamma' = \frac{\lambda e}{\omega^{2/3}} \sin \omega t$$

4. The corrector filter network of claim 2. in which said cell is further characterized by
said another operating means raising a signal input to the power $1/p$,
said operating means connected to the output of said filter to raise the output of said filter to a power equal to $p$
whereby there is thus obtained a non-linear cell.

5. An automatic regulation circuit utilizing cells as claimed in claim 4 comprising at least one corrector network filter including at least one cell.

6. The corrector filter network of claim 4, further comprising means to diminish the gain of the network with frequency while its phase shift remains low connected into a loop with a signal source.

7. The corrector filter network of claim 6, further comprising
additional cells, with all cells of semi-linear type, connected in series/parallel relationship to not subject the phase-gain relation to the limitations of the Bode's law.

8. A network comprising at least one cell including, connected in series, an operator which raises to the power "$1/p$," a filter, an operator which raises the output signal of said filter to the power $n \neq p$, whereby there is obtained a non-linear cell, the gain of which diminishes considerably with frequency while its phase-shift remains low, and in which the phase-gain relation is not subject to the limitations of Bode's law.

References Cited

UNITED STATES PATENTS

| | | | |
|---|---|---|---|
| 3,281,585 | 10/1966 | Zseleczky et al. | 307—229X |
| 3,322,970 | 5/1967 | Batteau | 307—295 |

STANLEY T. KRAWCZEWICZ, Primary Examiner

U.S. Cl. X.R.

307—229, 233, 295; 328—142, 144